(12) United States Patent
Boudreault et al.

(10) Patent No.: US 9,150,428 B2
(45) Date of Patent: Oct. 6, 2015

(54) METHODS FOR SEPARATING IRON IONS FROM ALUMINUM IONS

(75) Inventors: Richard Boudreault, St-Laurent (CA); Joël Fournier, Carignan (CA); Laury Gauthier, Saint-Apollinaire (CA)

(73) Assignee: ORBITE ALUMINAE INC., St-Laurent (CA)

( * ) Notice: Subject to any disclaimer, the term of this patent is extended or adjusted under 35 U.S.C. 154(b) by 56 days.

(21) Appl. No.: 14/122,461

(22) PCT Filed: Jun. 4, 2012

(86) PCT No.: PCT/CA2012/000541
§ 371 (c)(1),
(2), (4) Date: Mar. 12, 2014

(87) PCT Pub. No.: WO2012/162817
PCT Pub. Date: Dec. 6, 2012

(65) Prior Publication Data
US 2014/0301920 A1    Oct. 9, 2014

Related U.S. Application Data

(60) Provisional application No. 61/493,018, filed on Jun. 3, 2011.

(51) Int. Cl.
| | |
|---|---|
| C22B 21/00 | (2006.01) |
| C01G 49/02 | (2006.01) |
| C22B 3/12 | (2006.01) |
| C01G 49/06 | (2006.01) |
| C22B 3/06 | (2006.01) |
| C22B 3/44 | (2006.01) |

(52) U.S. Cl.
CPC .............. *C01G 49/02* (2013.01); *C01G 49/06* (2013.01); *C22B 3/06* (2013.01); *C22B 3/12* (2013.01); *C22B 3/44* (2013.01); *C22B 21/0015* (2013.01)

(58) Field of Classification Search
None
See application file for complete search history.

(56) References Cited

U.S. PATENT DOCUMENTS

| | | |
|---|---|---|
| 558,726 A | 4/1896 | Gooch |
| 650,763 A | 5/1900 | Raynaud |
| 1,494,029 A | 5/1924 | Scofield et al. |
| 1,501,873 A | 7/1924 | Daniel Tyrer |
| 1,519,880 A | 12/1924 | Heinrich et al. |
| 1,701,510 A | 2/1929 | Sieurin |
| 1,760,962 A | 6/1930 | Phillips et al. |
| 1,778,083 A | 10/1930 | Marburg |
| 1,906,467 A | 5/1933 | Heath |
| 1,931,515 A | 10/1933 | Fritz et al. |
| 1,956,139 A | 4/1934 | Staufer et al. |
| 1,962,498 A | 6/1934 | Frost |
| 1,999,773 A | 4/1935 | McMichael |
| 2,024,026 A | 12/1935 | Coleman et al. |
| 2,189,376 A | 2/1940 | Burman |
| 2,354,133 A | 7/1944 | Lyons |
| 2,376,696 A | 5/1945 | Hixson et al. |
| 2,406,577 A | 8/1946 | Alessandroni |
| 2,471,844 A | 5/1949 | Strelzoff |
| 2,489,309 A | 11/1949 | Mills et al. |
| 2,648,595 A | 8/1953 | Kennedy |
| 2,663,620 A | 12/1953 | Hinsdale, III |
| 2,707,149 A | 4/1955 | McKinley |
| 2,722,471 A | 11/1955 | Hirsch et al. |
| 2,769,686 A | 11/1956 | Michener, Jr. et al. |
| 2,771,344 A | 11/1956 | Michel et al. |
| 2,780,525 A | 2/1957 | Wendell, Jr. et al. |
| 2,806,766 A | 9/1957 | Anderson |
| 2,815,264 A | 12/1957 | Calkins et al. |
| 2,824,783 A | 2/1958 | Peppard et al. |
| 2,848,398 A | 8/1958 | Inagaki |
| 2,914,381 A | 11/1959 | Wainer |
| 2,914,464 A | 11/1959 | Burton et al. |
| 2,992,893 A | 7/1961 | Soudan et al. |
| 3,013,859 A | 12/1961 | Kuhlman, Jr. et al. |
| 3,104,950 A | 9/1963 | Ellis |
| 3,159,452 A | 12/1964 | Lerner |
| 3,192,128 A | 6/1965 | Brandmair et al. |
| 3,211,521 A | 10/1965 | George et al. |
| 3,473,919 A | 10/1969 | Metcalfe et al. |

(Continued)

FOREIGN PATENT DOCUMENTS

| | | |
|---|---|---|
| AU | 631226 | 2/1991 |
| AU | 4375001 | 12/2001 |

(Continued)

OTHER PUBLICATIONS

English Abstract of AU2008286599A1, "A process of smelting monazite rare earth ore rich in Fe", published on Feb. 19, 2009.

(Continued)

*Primary Examiner* — Steven Bos
(74) *Attorney, Agent, or Firm* — Bereskin & Parr LLP/S.E.N.C.R.L., s.r.l.

(57) ABSTRACT

There are provided methods for separating iron ions from aluminum ions. For example, the methods can comprise providing a basic aqueous composition comprising said iron ions and said aluminum ions and having a pH of about 10.5 to about 13 and a temperature of about 50 ° C. to about 150 ° C.; reacting said basic aqueous composition with hematite so as to promote, catalyze and/or enhance formation of hematite and to obtain a liquid phase comprising said aluminum ions and a solid phase comprising said so-formed hematite generated with said iron ions; and separating said liquid phase from said solid phase.

20 Claims, 2 Drawing Sheets

(56) References Cited

U.S. PATENT DOCUMENTS

Figure 1:
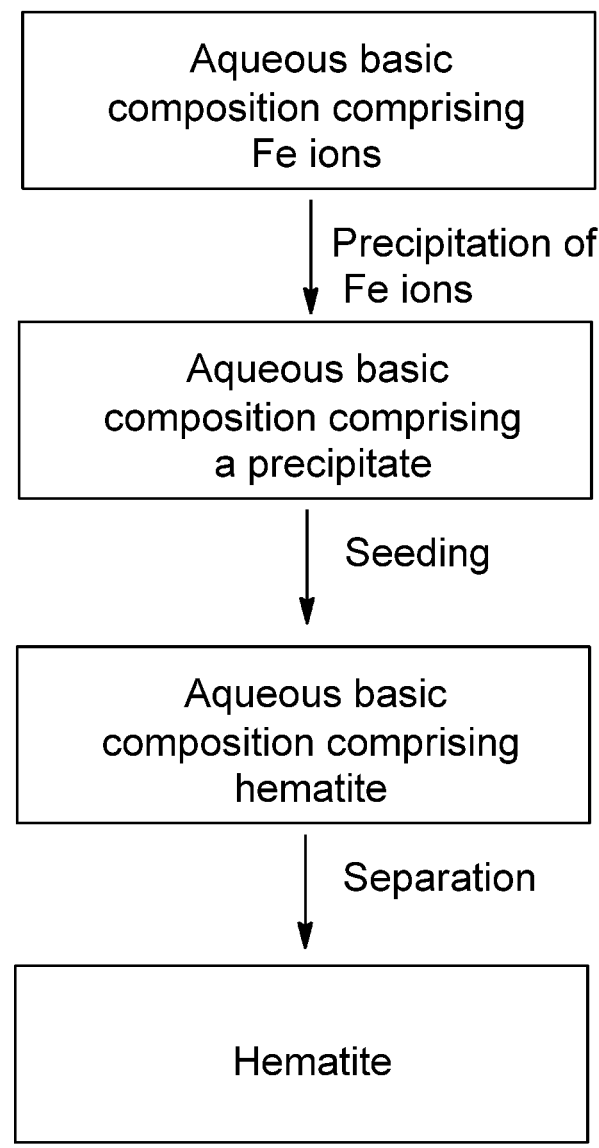
Figure 2:
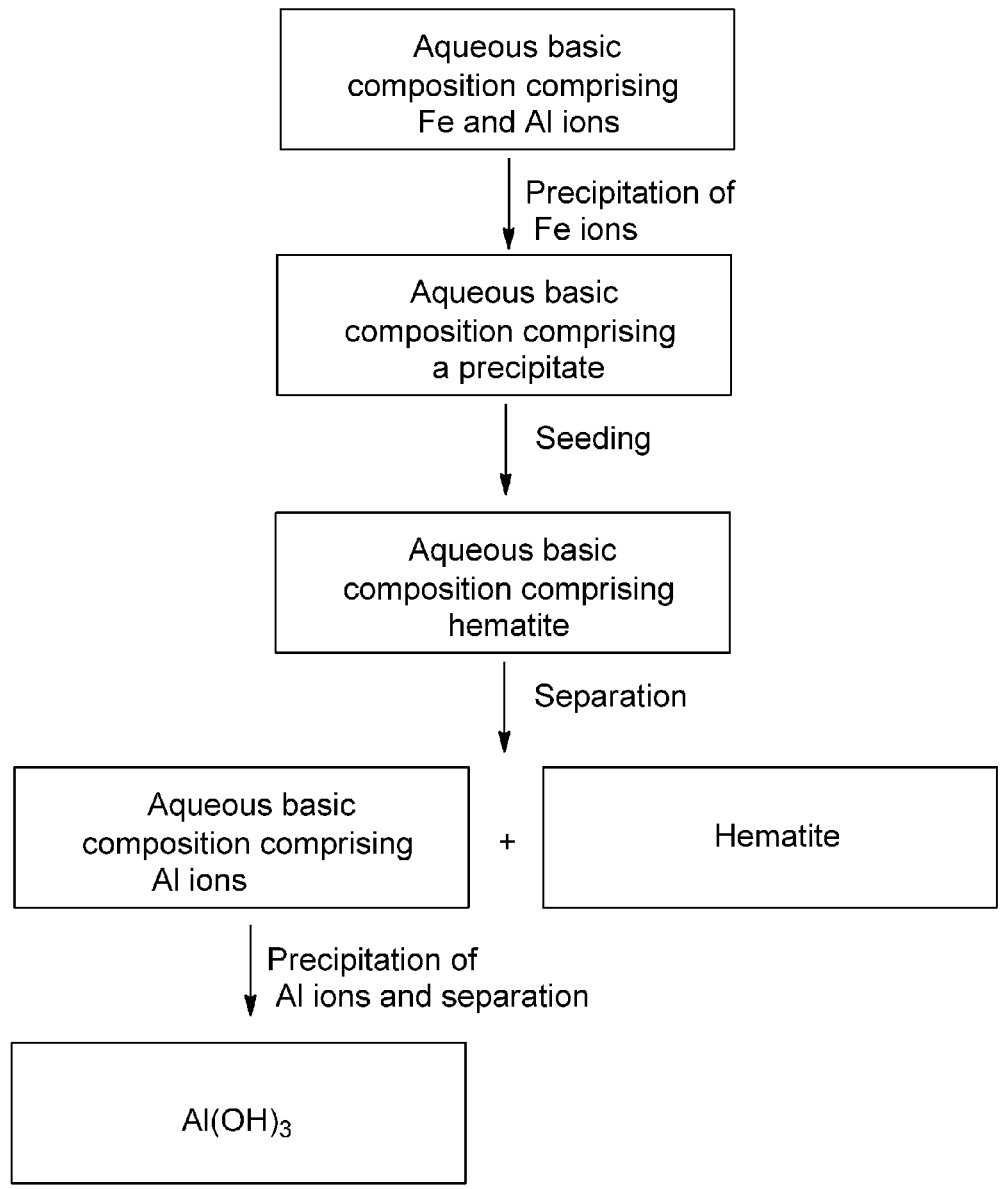

| | | |
|---|---|---|
| 3,479,136 A | 11/1969 | Michener, Jr. et al. |
| 3,540,860 A | 11/1970 | Cochran |
| 3,545,920 A | 12/1970 | George et al. |
| 3,586,477 A | 6/1971 | Flood |
| 3,620,671 A | 11/1971 | Maurel et al. |
| 3,642,441 A | 2/1972 | Van Weert |
| 3,649,185 A | 3/1972 | Sato et al. |
| 3,658,483 A | 4/1972 | Lienau et al. |
| 3,682,592 A | 8/1972 | Kovacs |
| 3,751,553 A | 8/1973 | Oslo et al. |
| 3,816,605 A | 6/1974 | Schwandorf |
| 3,852,430 A | 12/1974 | Lienau et al. |
| 3,862,293 A | 1/1975 | Maurel et al. |
| 3,903,239 A | 9/1975 | Berkovich |
| 3,922,164 A | 11/1975 | Reid et al. |
| 3,944,648 A | 3/1976 | Solymar et al. |
| 3,946,103 A | 3/1976 | Hund |
| 3,966,909 A | 6/1976 | Grunig et al. |
| 3,983,212 A | 9/1976 | Lowenstein et al. |
| 4,042,664 A | 8/1977 | Cardwell et al. |
| 4,045,537 A | 8/1977 | Hrishikesan |
| 4,048,285 A | 9/1977 | Szepesi et al. |
| 4,069,296 A | 1/1978 | Huang |
| 4,098,868 A | 7/1978 | Tolley |
| 4,107,281 A | 8/1978 | Reh et al. |
| 4,110,399 A | 8/1978 | Gaudernack et al. |
| 4,124,680 A | 11/1978 | Cohen et al. |
| 4,130,627 A | 12/1978 | Russ et al. |
| 4,133,677 A | 1/1979 | Matsui et al. |
| 4,151,267 A | 4/1979 | Puskas |
| 4,158,042 A | 6/1979 | Deutschman |
| 4,172,879 A | 10/1979 | Miller et al. |
| 4,177,242 A | 12/1979 | Cohen et al. |
| 4,193,968 A | 3/1980 | Sullivan et al. |
| 4,198,231 A | 4/1980 | Gusset |
| 4,222,989 A | 9/1980 | Belsky et al. |
| 4,224,287 A | 9/1980 | Ziegenbalg et al. |
| 4,226,844 A | 10/1980 | Reh et al. |
| 4,233,273 A | 11/1980 | Meyer et al. |
| 4,237,102 A | 12/1980 | Cohen et al. |
| 4,239,735 A | 12/1980 | Eisele et al. |
| 4,241,030 A | 12/1980 | Cohen et al. |
| 4,259,311 A | 3/1981 | Shah |
| 4,297,326 A | 10/1981 | Gjelsvik et al. |
| 4,318,896 A | 3/1982 | Schoonover |
| 4,362,703 A | 12/1982 | Boybay et al. |
| 4,370,422 A | 1/1983 | Panda et al. |
| 4,378,275 A | 3/1983 | Adamson et al. |
| 4,392,987 A | 7/1983 | Laine et al. |
| 4,402,932 A | 9/1983 | Miller et al. |
| 4,414,196 A | 11/1983 | Matsumoto et al. |
| 4,435,365 A | 3/1984 | Morris |
| 4,437,994 A | 3/1984 | Baker |
| 4,465,566 A | 8/1984 | Loutfy et al. |
| 4,465,659 A | 8/1984 | Cambridge et al. |
| 4,486,393 A | 12/1984 | Baksa et al. |
| 4,490,338 A | 12/1984 | De Schepper et al. |
| 4,530,819 A | 7/1985 | Czeglédi et al. |
| 4,560,541 A | 12/1985 | Davis |
| 4,567,026 A | 1/1986 | Lisowyj |
| 4,634,581 A | 1/1987 | Cambridge et al. |
| 4,652,433 A | 3/1987 | Ashworth et al. |
| 4,676,838 A | 6/1987 | Franz et al. |
| 4,710,369 A | 12/1987 | Bergman |
| 4,741,831 A | 5/1988 | Grinstead |
| 4,797,271 A | 1/1989 | Fleming et al. |
| 4,816,233 A | 3/1989 | Rourke et al. |
| 4,820,498 A | 4/1989 | Newkirk |
| 4,826,671 A | 5/1989 | Arndt et al. |
| 4,830,507 A | 5/1989 | Bagatto et al. |
| 4,898,719 A | 2/1990 | Rourke et al. |
| 4,913,884 A | 4/1990 | Feuling |
| 4,938,871 A | 7/1990 | Musikas et al. |
| 4,965,053 A | 10/1990 | Herchenroeder et al. |
| 4,968,504 A | 11/1990 | Rourke |
| 4,980,141 A | 12/1990 | Kimura et al. |
| 4,988,487 A | 1/1991 | Lai et al. |
| 4,995,984 A | 2/1991 | Barkatt |
| 5,006,753 A | 4/1991 | Hasker et al. |
| 5,008,089 A | 4/1991 | Moody et al. |
| 5,011,665 A | 4/1991 | Cailly et al. |
| 5,015,447 A | 5/1991 | Fulford et al. |
| 5,019,362 A | 5/1991 | Rourke et al. |
| 5,030,424 A | 7/1991 | Fulford et al. |
| 5,035,365 A | 7/1991 | Birmingham |
| 5,037,608 A | 8/1991 | Tarcy et al. |
| 5,043,077 A | 8/1991 | Chandler et al. |
| 5,045,209 A | 9/1991 | Snyder et al. |
| 5,061,474 A | 10/1991 | Pauli et al. |
| 5,071,472 A | 12/1991 | Traut et al. |
| 5,080,803 A | 1/1992 | Bagatto et al. |
| 5,091,159 A | 2/1992 | Connelly et al. |
| 5,093,091 A | 3/1992 | Dauplaise et al. |
| 5,104,544 A | 4/1992 | Shimizu et al. |
| 5,106,797 A | 4/1992 | Allaire |
| 5,112,534 A | 5/1992 | Guon et al. |
| 5,120,513 A | 6/1992 | Moody et al. |
| 5,124,008 A | 6/1992 | Rendall et al. |
| 5,149,412 A | 9/1992 | Allaire |
| 5,160,482 A | 11/1992 | Ash et al. |
| 5,180,563 A | 1/1993 | Lai et al. |
| 5,188,809 A | 2/1993 | Crocker et al. |
| 5,192,443 A | 3/1993 | Delloye et al. |
| 5,244,649 A | 9/1993 | Ostertag et al. |
| 5,274,129 A | 12/1993 | Natale et al. |
| 5,368,736 A | 11/1994 | Horwitz et al. |
| 5,409,677 A | 4/1995 | Zinn |
| 5,409,678 A | 4/1995 | Smith et al. |
| 5,433,931 A | 7/1995 | Bosserman |
| 5,443,618 A | 8/1995 | Chapman |
| 5,492,680 A | 2/1996 | Odekirk |
| 5,500,043 A | 3/1996 | Harada et al. |
| 5,505,857 A | 4/1996 | Misra et al. |
| 5,512,256 A | 4/1996 | Bray et al. |
| 5,531,970 A | 7/1996 | Carlson |
| 5,585,080 A | 12/1996 | Andersen et al. |
| 5,597,529 A | 1/1997 | Tack |
| 5,622,679 A | 4/1997 | Yuan et al. |
| 5,632,963 A | 5/1997 | Schwab et al. |
| 5,639,433 A | 6/1997 | Yuan et al. |
| 5,645,652 A | 7/1997 | Okinaka et al. |
| 5,665,244 A | 9/1997 | Rothenberg et al. |
| 5,720,882 A | 2/1998 | Stendahl et al. |
| 5,723,097 A | 3/1998 | Barnett et al. |
| 5,766,478 A | 6/1998 | Smith et al. |
| 5,787,332 A | 7/1998 | Black et al. |
| 5,792,330 A | 8/1998 | Petersen et al. |
| 5,795,482 A | 8/1998 | Ehle et al. |
| 5,876,584 A | 3/1999 | Cortellini |
| 5,885,545 A | 3/1999 | Pitzer |
| 5,904,856 A | 5/1999 | Kvant et al. |
| 5,911,967 A | 6/1999 | Ruthner |
| 5,922,403 A | 7/1999 | Tecle |
| 5,942,199 A | 8/1999 | Jokinen et al. |
| 5,955,042 A | 9/1999 | Barnett et al. |
| 5,962,125 A | 10/1999 | Masaki |
| 5,993,758 A | 11/1999 | Nehari et al. |
| 5,997,828 A | 12/1999 | Rendall |
| 6,033,579 A | 3/2000 | Riemer et al. |
| 6,045,631 A | 4/2000 | Tarcy et al. |
| 6,077,486 A | 6/2000 | Spitzer |
| 6,093,376 A | 7/2000 | Moore |
| 6,153,157 A | 11/2000 | McLaughlin |
| 6,214,306 B1 | 4/2001 | Aubert et al. |
| 6,221,233 B1 | 4/2001 | Rendall |
| 6,238,566 B1 | 5/2001 | Yoshida et al. |
| 6,248,302 B1 | 6/2001 | Barnett et al. |
| 6,254,782 B1 | 7/2001 | Kreisler |
| 6,267,936 B1 | 7/2001 | Delmas et al. |
| 6,302,952 B1 | 10/2001 | Mobbs et al. |
| 6,309,441 B1 | 10/2001 | Benz et al. |
| 6,312,653 B1 | 11/2001 | Delmau et al. |
| 6,337,061 B1 | 1/2002 | Iyatomi et al. |
| 6,348,154 B1 | 2/2002 | Stewart |

(56) References Cited

U.S. PATENT DOCUMENTS

| | | | |
|---|---|---|---|
| 6,383,255 | B1 | 5/2002 | Sundkvist |
| 6,395,062 | B2 | 5/2002 | Olafson et al. |
| 6,395,242 | B1 | 5/2002 | Allen et al. |
| 6,406,676 | B1 | 6/2002 | Sundkvist |
| 6,447,738 | B1 | 9/2002 | Rendall et al. |
| 6,468,483 | B2 | 10/2002 | Barnett et al. |
| 6,500,396 | B1 | 12/2002 | Lakshmanan et al. |
| 6,565,733 | B1 | 5/2003 | Sportel et al. |
| 6,576,204 | B2 | 6/2003 | Johansen |
| 6,716,353 | B1 | 4/2004 | Mirzadeh et al. |
| 6,843,970 | B1 | 1/2005 | Hard |
| 6,893,474 | B2 | 5/2005 | Jäfverström et al. |
| 7,090,809 | B2 | 8/2006 | Harel et al. |
| 7,118,719 | B2 | 10/2006 | Fugleberg |
| 7,182,931 | B2 | 2/2007 | Turnbaugh, Jr. et al. |
| 7,220,394 | B2 | 5/2007 | Sreeram et al. |
| 7,282,187 | B1 | 10/2007 | Brown et al. |
| 7,294,319 | B2 | 11/2007 | Lahtinen et al. |
| 7,381,690 | B1 | 6/2008 | Ding et al. |
| 7,442,361 | B1 | 10/2008 | Gloeckler et al. |
| 7,498,005 | B2 | 3/2009 | Yadav |
| 7,651,676 | B2 | 1/2010 | Beaulieu et al. |
| 7,781,365 | B2 | 8/2010 | Okamoto |
| 7,837,961 | B2 | 11/2010 | Boudreault et al. |
| 7,892,426 | B2 | 2/2011 | Hayashi et al. |
| 7,906,097 | B2 | 3/2011 | Beaulieu et al. |
| 8,038,969 | B2 | 10/2011 | Kondo et al. |
| 8,147,795 | B2 | 4/2012 | Dolling et al. |
| 8,216,532 | B1 | 7/2012 | Vierheilig |
| 8,241,594 | B2 | 8/2012 | Boudreault et al. |
| 8,287,826 | B2 | 10/2012 | Pettey |
| 8,337,789 | B2 | 12/2012 | Boudreault et al. |
| 2002/0050230 | A1 | 5/2002 | Meisen |
| 2002/0071802 | A1 | 6/2002 | Fulton et al. |
| 2003/0075021 | A1 | 4/2003 | Young et al. |
| 2003/0152502 | A1 | 8/2003 | Lewis et al. |
| 2003/0183043 | A1 | 10/2003 | Wai et al. |
| 2004/0042945 | A1 | 3/2004 | Rao et al. |
| 2004/0062695 | A1 | 4/2004 | Horwitz et al. |
| 2005/0166706 | A1 | 8/2005 | Withers et al. |
| 2006/0018813 | A1 | 1/2006 | Bray |
| 2006/0066998 | A1 | 3/2006 | Ishiguro |
| 2007/0062669 | A1 | 3/2007 | Song et al. |
| 2007/0278106 | A1 | 12/2007 | Shaw |
| 2008/0047395 | A1 | 2/2008 | Liu et al. |
| 2008/0069748 | A1 | 3/2008 | Lien et al. |
| 2008/0115627 | A1 | 5/2008 | Wang et al. |
| 2008/0286182 | A1 | 11/2008 | Costa et al. |
| 2009/0241731 | A1 | 10/2009 | Pereira et al. |
| 2009/0272230 | A1 | 11/2009 | Mackowski et al. |
| 2010/0018347 | A1 | 1/2010 | Holden et al. |
| 2010/0078382 | A1 | 4/2010 | Naganawa et al. |
| 2010/0129277 | A1 | 5/2010 | Kondo et al. |
| 2010/0150799 | A1 | 6/2010 | Boudreault et al. |
| 2010/0160144 | A1 | 6/2010 | Kim et al. |
| 2010/0260640 | A1 | 10/2010 | Shindo et al. |
| 2010/0278720 | A1 | 11/2010 | Wong et al. |
| 2010/0319491 | A1 | 12/2010 | Sugahara et al. |
| 2010/0329970 | A1 | 12/2010 | Lian et al. |
| 2011/0017020 | A1 | 1/2011 | Homma et al. |
| 2011/0044869 | A1 | 2/2011 | Boudreault et al. |
| 2011/0120267 | A1 | 5/2011 | Roche |
| 2011/0182786 | A1 | 7/2011 | Burba, III |
| 2012/0073407 | A1 | 3/2012 | Drinkard, Jr. et al. |
| 2012/0237418 | A1 | 9/2012 | Boudreault et al. |
| 2013/0052103 | A1 | 2/2013 | Boudreault et al. |
| 2014/0341790 | A1 | 11/2014 | Kasaini |
| 2014/0356262 | A1 | 12/2014 | Ruth et al. |

FOREIGN PATENT DOCUMENTS

| | | |
|---|---|---|
| CA | 1066872 | 11/1979 |
| CA | 1088961 | 11/1980 |
| CA | 1136380 | 11/1982 |
| CA | 1176470 | 10/1984 |
| CA | 1224327 | 7/1987 |
| CA | 1226719 | 9/1987 |
| CA | 2027519 | 4/1991 |
| CA | 2027973 | 4/1991 |
| CA | 2029623 | 5/1991 |
| CA | 2036058 | 8/1991 |
| CA | 2097809 | 7/1992 |
| CA | 2137249 | 12/1993 |
| CA | 2122364 | 2/1994 |
| CA | 2156295 | 9/1994 |
| CA | 2160488 | 11/1994 |
| CA | 2193726 | 1/1996 |
| CA | 2159534 | 4/1996 |
| CA | 2167890 | 7/1996 |
| CA | 2240067 | 6/1997 |
| CA | 2251433 | 4/1999 |
| CA | 2360447 | 8/2000 |
| CA | 2306015 | 12/2000 |
| CA | 2309225 | 12/2000 |
| CA | 2377600 | 1/2001 |
| CA | 2317692 | 3/2001 |
| CA | 2391394 | 5/2001 |
| CA | 2400673 | 8/2001 |
| CA | 2429889 | 6/2002 |
| CA | 2431466 | 6/2002 |
| CA | 2433448 | 7/2002 |
| CA | 2189631 | 11/2002 |
| CA | 2454812 | 2/2003 |
| CA | 2468885 | 7/2003 |
| CA | 2471179 | 7/2003 |
| CA | 2484134 | 11/2003 |
| CA | 2467288 | 11/2004 |
| CA | 2548225 | 11/2004 |
| CA | 2385775 | 5/2005 |
| CA | 2556613 | 8/2005 |
| CA | 2572190 | 1/2006 |
| CA | 2597440 | 8/2006 |
| CA | 2521817 | 3/2007 |
| CA | 2624612 | 4/2007 |
| CA | 2629167 | 5/2007 |
| CA | 2639796 | 6/2007 |
| CA | 2636379 | 7/2007 |
| CA | 2641919 | 8/2007 |
| CA | 2608973 | 1/2008 |
| CA | 2610918 | 2/2008 |
| CA | 2659449 | 2/2008 |
| CA | 2684696 | 11/2008 |
| CA | 2685369 | 11/2008 |
| CA | 2711013 | 11/2008 |
| CA | 2697789 | 3/2009 |
| CA | 2725391 | 11/2009 |
| CA | 2678724 | 3/2010 |
| CA | 2745572 | 7/2010 |
| CA | 2747370 | 7/2010 |
| CA | 2667029 | 11/2010 |
| CA | 2667033 | 11/2010 |
| CA | 2678276 | 3/2011 |
| CA | 2773571 | 3/2011 |
| CA | 2788965 | 8/2011 |
| CA | 2797561 | 11/2011 |
| CA | 2884787 | 4/2013 |
| CA | 2860491 | 8/2013 |
| CN | 1099424 | 3/1995 |
| CN | 1923730 | 3/2007 |
| CN | 101773925 | 7/2010 |
| CN | 101792185 | 8/2010 |
| DE | 19903011 | 8/2000 |
| EP | 157503 | 10/1985 |
| EP | 0054976 | 7/1986 |
| EP | 0238185 | 9/1987 |
| EP | 0279672 | 8/1988 |
| EP | 0327234 | 8/1989 |
| EP | 0382383 | 8/1990 |
| EP | 0399786 | 11/1990 |
| EP | 508676 | 10/1992 |
| EP | 466338 | 12/1995 |
| EP | 0829454 | 3/1998 |
| EP | 0834584 | 4/1998 |

(56) References Cited

FOREIGN PATENT DOCUMENTS

| | | |
|---|---|---|
| EP | 999185 | 5/2000 |
| EP | 1496063 | 1/2005 |
| EP | 2241649 | 10/2010 |
| EP | 2298944 | 3/2011 |
| FR | 2600635 | 12/1987 |
| GB | 153500 | 11/1920 |
| GB | 159086 | 2/1921 |
| GB | 195295 | 3/1923 |
| GB | 230916 | 3/1925 |
| GB | 240834 | 5/1926 |
| GB | 241184 | 5/1926 |
| GB | 273999 | 7/1927 |
| GB | 409710 | 5/1934 |
| GB | 470305 | 8/1937 |
| GB | 480921 | 3/1938 |
| GB | 490099 | 8/1938 |
| GB | 745601 | 2/1956 |
| GB | 798750 | 7/1958 |
| GB | 857245 | 12/1960 |
| GB | 858026 | 1/1961 |
| GB | 1021326 | 3/1966 |
| GB | 1056488 | 1/1967 |
| GB | 2013164 | 8/1979 |
| GB | 1552918 | 9/1979 |
| GB | 2018230 | 10/1979 |
| GB | 2238813 | 6/1991 |
| JP | 6056429 | 3/1994 |
| OA | 010034 | 10/1996 |
| WO | 9213637 | 8/1992 |
| WO | 9313017 | 7/1993 |
| WO | 9418122 | 8/1994 |
| WO | 9600698 | 1/1996 |
| WO | 9722554 | 6/1997 |
| WO | 0104366 | 1/2001 |
| WO | 2004056468 | 7/2004 |
| WO | 2004056471 | 7/2004 |
| WO | 2004101833 | 11/2004 |
| WO | 2005123591 | 12/2005 |
| WO | 2006084682 | 8/2006 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009085514 | 7/2009 |
| WO | 2009153321 | 12/2009 |
| WO | 2010002059 | 1/2010 |
| WO | 2010009512 | 1/2010 |
| WO | 2010079369 | 7/2010 |
| WO | 2010133284 | 11/2010 |
| WO | 2011100821 | 8/2011 |
| WO | 2012126092 | 9/2012 |
| WO | 2012145797 | 11/2012 |
| WO | 2012149642 | 11/2012 |
| WO | 2013037054 | 3/2013 |
| WO | 2013142957 | 10/2013 |
| WO | 2014094155 | 6/2014 |
| WO | 2014094157 | 6/2014 |

OTHER PUBLICATIONS

English Abstract of KR820001546, "Production of Titanium Metal Valves", published on Aug. 31, 1982.
English Abstract of KR100927466, published on Nov. 19, 2009.
English Abstract of RU 2 069 180, published on Nov. 20, 1996.
English Abstract of RU 2 068 392, published on Oct. 27, 1996.
English Abstract of RU 2 062 810, published on Jun. 27, 1996.
English Abstract of RU 2 055 828, published on Mar. 10, 1996.
English Abstract of RU 2 049 728, published on Dec. 10, 1995.
English Abstract of RU 1 704 483, published on Oct. 27, 1996.
English Abstract of SU1567518, published on May 30, 1990.
English Abstract of SU1424174, published on Jul. 23, 1991.
English Abstract of RU2038309, published on Jun. 27, 1995.
English Abstract of HU51574, published on May 28, 1990.
English Abstract of JP2008253142, published on Oct. 23, 2008.
English Abstract of JP2005152756, published on Jun. 16, 2005.
English Abstract of JP2005082462, published on Mar. 31, 2005.
English Abstract of JP2005219938, published on Aug. 18, 2005.
English Abstract of JP2004036003, published on Feb. 5, 2004.
English Abstract of WO2011092292, published on Aug. 4, 2011.
English Abstract of CN101157453, published on Apr. 9, 2008.
English Abstract of AU2737892, published on May 13, 1993.
English Abstract of JPH09249420, published on Sep. 22, 1997.
English Abstract of CN102515590, published on Jun. 27, 2012.
English Abstract of CN102502745, published on Jun. 20, 2012.
English Abstract of WO2007082447, published on Jun. 26, 2007.
English Abstract of CN102694218, published on Sep. 26, 2012.
English Abstract of RU2183225, published on Jun. 10, 2002.
English Abstract of JP2009249674, published on Oct. 29, 2009.
English Abstract of CN102719674, published on Oct. 10, 2012.
English Abstract of 102680423, published on Sep. 19, 2012.
English Abstract of JP2005112636, published on Apr. 28, 2005.
English Abstract of CN101285127, published on Oct. 15, 2008.
Australie Minerals & Mining Group Ltd, "AMMG Updates Process Design for HPA Chemical Project", Oct. 3, 2014, pp. 1-4.
Adham et al., "Fluid Bed Dehydration of Magnesium Chloride", Magnesium Technology 2012, TMS (The Minerals, Metals & Materials Society), 2012, pp. 49-53.
Dutrizac et al., "Fundamentals of Serpentine Leaching in Hydrochloric Acid Media", Magnesium Technology 2000, The Minerals, Metals & Materials Society, 2000, pp. 41-51.
English Abstract of CN1044126(C), "Stretched polypropylene film", published on Jul. 14, 1999.
Kumar et al., "Refining of a low-grade molybdenite concentrate", Hydrometallurgy 86 (2007) 56-62.
Wang et al., "Metallurgical processes for scandium recovery from various resources: A review", Hydrometallurgy 108 (2011) 100-108.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep, 20, 2002.
English Abstract of RU2176680, published on Dec. 10, 2001.
English Abstract of RU2162898, published on Feb. 10, 2001.
English Abstract of RU2162112, published on Jan. 20, 2001.
English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.
English Abstract of JP5051208, published on Mar. 2, 1993.
English Abstract of JP4198017, published on Jul. 17, 1992.
English Abstract of JP4183832, published on Jun. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.

(56) References Cited

OTHER PUBLICATIONS

English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.
An English translation of Zhang et al., "Research of the Controlling Steps of the Reaction of Kaolin and Hydrochloric Acid", Journal of Hefei University of Technology, vol. 21, No. 1, Feb. 1998, pp. 50-53.
An English translation of Zhang et al., "Kinetics Research on Alumina in Kaolinite Leached by Hydrochloric Acid", Journal of Hefei University of Technology, vol. 22, No. 2, Apr. 1999, pp. 33-36.
Certification of translation from Park IP Translations dated May 14, 2012.
An English Abstract of CN101450811 "Method for extracting alumina from coal gangue", published on Jun. 10, 2009.
An English Abstract of JP2001162108 "Method for Manufacturing Iron-Aluminum Combined Flocculant", published on Jun. 19, 2001.
English Translation of Abstract of CN101462757, "Preparation of nano Na-beat-alumina powder", Jun. 24, 2009.
An English Abstract of JP57145027 "Preparation of Granular Alumina", published on Sep. 7, 1982.
An English Abstract of CA1065068 "Method of Selectively Precipitating Metals From Solutions", published on Oct. 23, 1979.
English Translation of Abstract of CN101289705, "Process for abstracting vanadium from iron-smeltin waste slag of vanadium-containing iron ore", Jul. 14, 2010.
English Translation of Abstract of CN102220487, "Method for extracting vanadium and aluminum from vanadium-containing stone coal and clay vanadium ore", Oct. 19, 2011.
English Translation of Abstract of CN102241410, "Ecological and Comprehensive Utilization Method of Coal Ash", Nov. 16, 2011.
English Translation of Abstract of RU2363748, "Method of Producing Aluminium", Aug. 10, 2009.
English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.
English Translation of Abstract of WO2009005115, "Composition for promotion of reduction in size of adipocyte", Jan. 8, 2009.
English Translation of Abstract of CN101434484, "Processes for producing alumina ceramic valve body and use thereof", May 20, 2009.
English Translation of Abstract of CN101045543, "Method for preparing sheet alumina using coal series kaolin rock or flyash as raw material", Oct. 3, 2007.
English Translation of Abstract of CN101249965, "Method for preparing ultra-fine white carbon black and nano alumina by using kaolinite as raw material", Aug. 27, 2008.
English Translation of Abstract of CN101045538, "Method for preparing modified silicon oxide using coal series kaolin rock or flyash", Oct. 3, 2007.
Hudson et al., "Direct Calcination of AICl3 •6H20 with Off-Gas use for Crystallization", United States Department of the Interior Bureau of Mines, Contract No. J0188096, 1979, pp. 1-28.
Elsner et al., "Alumina via hydrochloric acid leaching of high silica bauxites—Process Development", 1984, pp. 411-429.
Maysilles et al., "Aluminum Chloride Hexahydrate Crystallization by HCl Gas Sparging", U.S. Dept. of the Interior, Bureau of Mines, 1982, pp. 1-38.
English Translation of CN102452677, published on May 16, 2012.
Brand et al., "Formation of $\alpha$-Al2O3 by thermal decomposition of basic aluminum chlorides at low temperatures", Crystal Research and Technology 1989 (24) 671-675.
Park et al., "Manufacture of low-soda alumina from clay", Industrial and Engineering Chemistry 1996 (35) 4379-4385.
Yanagida et al., "The role of water vapor in formation of alpha alumina from transient alumina" Journal of Ceramic Association Japan 1966 (74) 371-77.
Pijolat et al., "Influence of additives and water vapor on the transformation of transition aluminas into alpha alumina", Thermochimica Acta 1987 (122) 71-77.
Bagwell et al., "Effect of seeding and water vapor on the nucleation and growth of $\alpha$-Al2O3 from $\gamma$-Al2O3", Journal of the American Ceramic Society 1999 (82) 825-832.
Hrabe et al., "The influence of water vapor on thermal transformations of boehmite", Journal of Material Research 1992 (7) 444-449.
English Abstract of Petzold et al., "Thermoanalytical studies on the decomposition of aluminum chloride hexahydrate", Journal of thermal analysis 1981 (20) 71-86.
Hoffman et al., "Development of a hydrochloric acid process for the production of alumina from clay", Journal of research of the national bureau of standards 1946 (37) 409-428.
Marchessaux et al., "Thermal decomposition of aluminum hexahydrate chloride (AICl3×6H2O) for alumina production", Light metals 1979 (1) 189-204.
Miller et al., "Fluidized-bed decomposition of aluminum chloride hexahydrate", Light Metals: Proceedings of Sessions, Aime Annual Meeting (Warrendale, Pennsylvania), 1983 253-271.
English Abstract of CN101781719, "Method for recovering rare earth from oil shale waste slag", published on Jul. 21, 2010.
Shanks et al., "Options in the HC1 process for the production of alumina from clay", Light Metals 1986, R.E. Miller, Editor, p. 1089.
Bengston et al., "Alumina process feasibility study and preliminary pilot plant design. Task 3 report: preliminary design of 25 ton per day pilot plant.", vol. 1, Process Technology and Costs. Bureau of Mines Open File Report PB81-125031, 1979.
Liu et al., "High Purity Alumina Powders Extracted from Aluminum Dross by the Calcining-Leaching Process", TMS (The Minerals, Metals & Materials Society), 2011, pp. 197-200.
Gunnar et al., Abstract of "Extraction of iron compounds from wood from the Vasa", Department of Chemistry, Swedish University of Agricultural Sciences, vol. 60, No. 6, pp. 678-684, 2006.
Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, 2010.
Cohen et al., "Precipitation of iron from concentrated chloride solutions: Literature observations, challenges and preliminary experimental results", Minerals Engineering 18 (2005), pp. 1344-1347.
Tceisele, "Primary Metal Production", Dec. 3, 2007.
US EPA, "Alumina & Aluminum", Office of Resource Conservation and Recovery, Apr. 2, 2012.
Cablik, "Characterization and applications of red mud from bauxite processing", VSB-Technical University of Ostrava, Faculty of Mining and Geology, pp. 27-37, 2007.
Wahab et al., "Alumina Recovery From Iraqi Kaolinitic Clay by Hydrochloric Acid Route", Iraqi Bulletin of Geology and Mining, vol. 2, No. 1, 2006, pp. 67-76.
Abstract of Dash et al., "Acid dissolution of alumina from waste aluminium dross", Hydrometallurgy, vol. 92, issues 1-2, May 2008, pp. 48-53.
Khan et al., "Production of Aluminum Sulphate from Indigenous Bauxite without Precalcination of the Ore", Jour. Chem Soc. Pak., vol. 17, No. 4, pp. 213-216, 1995.
Sahoo et al., "Characterization of $\gamma$- and $\alpha$-Fe2O3 nano powders synthesized by emulsion precipitation-calcination route and rheological behavior of $\alpha$-Fe2O3", International Journal of Engineering, Science and Technology, vol. 2, No. 8, pp. 118-126, 2010.
Bharathi et al., "Highly mesoporous $\alpha$-Fe2O3 nanostructures: preparation, characterization and improved photocatalytic performance towards Rhodamine B (RhB)", J. Phys. D: Appl. Phys. 43 015501, pp. 1-9, 2010.

(56) References Cited

OTHER PUBLICATIONS

"Industrial Inorganic Pigments", Wiley—VCH Verlag GmbH and Co. KgaA, pp. 105-112, 1993.
Andrieux et al., Abstract of: "Hydrothermal synthesis of dioctahedral smectites: The Al—Fe3+ chemical series: Part I: Influence of experimental conditions", Universite de Poitiers, 2009.
Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, 2005.
Aleksandrovich, "The receipt of alumina from clay materials", 2011.
Copson et al., "Extraction of Alumina from Clays by the Lime-sinter Modification of the Pedersen Process", New York Meeting, Feb. 1944, pp. 241-254.
Al-Zahrani et al., "Extraction of Alumina from Local Clays by Hydrochloric Acid Process", JKAU: Eng. Sci., vol. 20, No. 2, pp. 29-41, 2009.
Dutrizac et al., "The Precipitation of Hematite from Ferric Chloride Media at Atmospheric Pressure", Mining and Mineral Sciences Laboratories, vol. 30B, Dec. 1999, pp. 993-1001.
Riveros et al., "The precipitation of hematite from ferric chloride media", Mining and Mineral Sciences Laboratories, Hydrometallurgy 46 (1997), pp. 85-104.
Smirnov, V., "Alumina production in Russia Part I: Historical background", Journal of Materials, vol. 48, Issue 8, 1996, pp. 24-26.
Wei, X. et al., "Recovery of Iron and Aluminium from Acid Mine Drainage by selective precipitation", Environmental Engineering Science, vol. 22, No. 6, 2005, pp. 745-755.
Ajemba et al., "Application of the Shrinking Core Model to the Analysis of Alumina Leaching From Ukpor Clay Using Nitric Acid", International Journal of Engineering Research & Technology (IJERT), ISSN: 2278-0181, vol. 1 Issue 3, May 2012.
Zhou et al., "Extraction of Scandium from red mud by modified activated carbon and kinetics study", Rare Metals, vol. 27, No. 3, Jun. 2008, pp. 223-227.
Wang et al., "A novel recovery process of metal values from the cathode active materials of the lithium-ion secondary batteries", Hydrometallurgy 99 (2009) 194-201.
Yatsenko et al., "Red Mud Pulp Carbonization with Scandium Extraction during alumina Production", ISSN 0040-5795, Theoretical Foundations of Chemical Engineering, 2010, vol. 44, No. 4, pp. 563-568.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
Wang et al., "Recovery of scandium from synthetic red mud leach solutions by solvent extraction with D2EHPA", Separation and Purification Technology (2013), pp. 1-14.
Andritz Metals, "Regeneration Systems for Hydrochloric Waste Pickling Solutions", 2011.
Aluminium for Future Generations, "Bauxite Residual Management", http://bauxite.world-aluminium.org/refining/bauxite-residue-management.html.
Vedanta Aluminium Limited, Lanjigarh, "Red Mud Filtration and Recovery of Valuable Metals", 2001, http://marvels.engineeringwatch.in/eea025/.
English Abstract BE1019347, "Hydrometallurgical Reactor", published on Jun. 5, 2012.
Abstract Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
English Abstract CN102690954, "Back extraction and removement method for aluminium", published on Sep. 26, 2012.
English Abstract CN101781719, "Method for recovering rare earth from oil shale waste slag", published on Jul. 21, 2010.
English Abstract CN102643985, "Method for extracting valuable metals from high-iron bauxite with step-by-step acid leaching", published on Aug. 22, 2012.
English Abstract CN102628105, "Method for comprehensively recycling and using baric waste slag in refined aluminum production process", published on Aug. 8, 2012.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.
English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of CN101182601, published on May 21, 2008.
English Abstract of CN1043752C, published on Jun. 23, 1999.
English Abstract of CN87101034, published on Aug. 28, 1991.
English Abstract of RU2079431, published on May 20, 1997.
English Abstract of RU2063458, published on Jul. 10, 1996.
English Abstract of RU 2 048 565, published on Nov. 20, 1995.
English Abstract of RU 2 040 587, published on Jul. 25, 1995.
English Abstract of RU 2 034 074, published on Apr. 30, 1995.
English Abstract of RU 2 031 168, published on Mar. 20, 1995.
English Abstract of RU 2 020 175, published on Sep. 30, 1994.
English Abstract of RU 2 010 876, published on Apr. 15, 1994.
English Abstract of RU 2 094 374, published on Oct. 27, 1997.
English Abstract of RU 2 081 831, published on Jun. 20, 1997.
English Abstract of RU 2 070 596, published on Dec. 20, 1996.
Fang et al., "Recovery of gallium from coal fly ash", Hydrometallurgy 41 (1996) 187-200.
Gutierrez et al., "Recovery of gallium from coal fly ash by a dual reactive extraction process", Waste Management & Research (1997) 16, 371-382.
Becze et al., "Precipitation of Hematite and Recovery of Hydrochloric Acid from Concentrated Chloride Solutions by a Novel Hydrolytic Decomposition Process", TMS (The Minerals & Materials Society, 2001.
Demopoulos et al., "New Technologies for Hci Regeneration in Chloride Hydrometallurgy", World of Metallurgy—Erzmetall 61 (2008) No. 2.
English Abstract of CN103964480(A), "Process for Producing Aluminum Oxide by Using Hydrochloric Acid Method", published on Aug. 6, 2014.
English Abstract of CN203922759(U), "Device for Preparing Aluminum Oxide by Roasting Aluminum Chloride Hexahydrate Crystal through Rotary Kiln", published on Nov. 5, 2014.
English Abstract of EP0850881(A1), "Process and Apparatus for the Preparation of Iron Oxides from Solutions Containing Hydrochloric Acid Iron Oxide Chloride", published on Jul. 1, 1998.

(56) References Cited

OTHER PUBLICATIONS

English Abstract of JPH0543252A, "Method for Removing Halogen Radical in Ferric Oxide", published on Feb. 23, 1993.
English Abstract of JPH0656429(A), "Production of Plate-Like Iron Oxide Particulate Powder", published on Mar. 1, 1994.
English Abstract of WO2008070885(A2), "Method for Increasing the Specific Surface of Iron Oxides in Spray Roasting Plants", published on Jun. 19, 2008.
English Abtract of CN1099424A, "Method for Treating Blast Furnace Slag with Diluted Chlorhydric Acid", published on Mar. 1, 1995.
Weissenbaeck et al., "Development of Chloride Based Metal Extraction Techniques", Paper presented at ALTA 2013, Perth, WA.

US 9,150,428 B2

METHODS FOR SEPARATING IRON IONS FROM ALUMINUM IONS

CROSS-REFERENCE TO RELATED APPLICATIONS

The present application is a 35 USC 371 national stage entry of PCT/CA2012/000541 filed on Jun. 4, 2012 and which claims priority on U.S. 61/493,018 filed on Jun. 3, 2011. These documents are hereby incorporated by reference in their entirety.

TECHNICAL FIELD

The present disclosure relates to improvements in the field of chemistry applied to the synthesis of iron-based products. For example, such methods are useful for the preparation of hematite.

BACKGROUND OF THE DISCLOSURE

Hematite has been used as a colorant for centuries. It is the most common type of naturally occurring iron oxide mineral. Examples of hematites include hematites, pyrites, and magnetites, which are respectively red-colored, yellow-colored, and black-colored. Hematites are mostly prepared as synthetic products, and thus are used in various fields as pigments having clear color tones and excellent durability, being inexpensive and having low toxicity and high stability. In particular, well-known synthetic hematite pigments include red or red brown-colored hematite particle powder ($\alpha$-$Fe_2O_3$ or micaceous iron oxide (MIO)), yellow or deep brown-colored maghemite ($\gamma$-$Fe_2O_3$) particle powder, and black-colored magnetite ($FeOx$-$Fe_2O_3$ where $0<x<=1$). Many of the processes proposed so far for preparing such products comprise at least one drawbacks such as being not cost effective, not being environmental friendly or being complicated.

There is thus a need for at least providing an alternative to the existing solutions for preparing hematites. Moreover, there would be a need for valorizing certain waste materials and at least partially convert them into hematite.

SUMMARY OF THE DISCLOSURE

According to one aspect, there is provided a method for preparing hematite. The method comprises obtaining the hematite from a basic aqueous composition comprising at least one precipitated iron ion, having a pH of about 10.5 to about 12 and being at a temperature of about 70° C. to about 120° C., by reacting the composition with a predetermined quantity of hematite, thereby promoting, catalyzing and/or enhancing formation of the hematite.

According to another aspect, there is provided a method for preparing hematite. The method comprises obtaining the hematite from a basic aqueous composition comprising at least one precipitated iron ion, having a pH of about 10.5 to about 13 and being at a temperature of about 50° C. to about 150° C., by reacting the composition with hematite, thereby promoting, catalyzing and/or enhancing formation of the hematite.

According to one aspect, there is provided a method for preparing hematite. The method comprises obtaining the hematite from a basic aqueous composition comprising at least one precipitated iron ion, having a pH of about 10.5 to about 12 and being at a temperature of about 70° C. to about 120° C., by reacting the composition with a predetermined quantity of hematite, thereby promoting, catalyzing and/or enhancing formation of the hematite.

According to another aspect, there is provided a method for separating iron ions from aluminum ions contained in a basic aqueous composition, the method comprising:
  obtaining a basic aqueous composition comprising iron ions and aluminum ions and having a pH of about 10.5 to about 12 and a temperature of about 70° C. to about 120° C.;
  reacting the composition with a predetermined quantity of hematite so as to promote, catalyze and/or enhance formation of hematite and to obtain a liquid phase comprising the aluminum ions and a solid phase comprising the so-formed hematite; and
  separating the liquid phase from the solid phase.

According to another aspect, there is provided a method for separating iron ions from aluminum ions contained in a basic aqueous composition, the method comprising:
  obtaining a basic aqueous composition comprising the iron ions and the aluminum ions and having a pH of about 10.5 to about 13 and a temperature of about 50° C. to about 150° C.;
  reacting the composition with hematite so as to promote, catalyze and/or enhance formation of hematite and to obtain a liquid phase comprising the aluminum ions and a solid phase comprising the so-formed hematite; and
  separating the liquid phase from the solid phase.

According to another aspect, there is provided a method for separating iron ions from aluminum ions contained in a basic aqueous composition, the method comprising:
  obtaining the basic aqueous composition comprising the iron ions and the aluminum ions and having a pH of about 10.5 to about 13 and a temperature of about 50° C. to about 150° C.;
  reacting the basic aqueous composition with hematite so as to promote, catalyze and/or enhance formation of hematite and to obtain a liquid phase comprising the aluminum ions and a solid phase comprising the so-formed hematite generated with at least a portion of the iron ions; and
  separating the liquid phase from the solid phase.

According to another aspect, there is provided a method for separating iron ions from aluminum ions contained in a basic aqueous composition, the method comprising:
  reacting the basic aqueous composition comprising the iron ions and the aluminum ions with a seeding agent under conditions suitable for promoting, catalyzing and/or enhancing formation of hematite under the form of a precipitate, thereby obtaining a liquid phase and a solid phase; and
  separating the liquid phase from the solid phase.

According to another aspect, there is provided a method for separating iron ions from aluminum ions contained in a basic aqueous composition, the method comprising:
  reacting the basic aqueous composition comprising the iron ions and the aluminum ions with a seeding agent under conditions suitable for at least partially converting the iron ions into hematite under the form of a precipitate, thereby obtaining a liquid phase and a solid phase; and
  separating the liquid phase from the solid phase.

According to another aspect, there is provided a method for separating iron from aluminum contained in a basic aqueous composition, the method comprising:
  reacting the basic aqueous composition comprising the iron and the aluminum with hematite under conditions suitable for at least partially converting the iron into hematite under the form of a precipitate, thereby obtaining a liquid phase and a solid phase; and separating the liquid phase from the solid phase.

DETAILED DESCRIPTION OF VARIOUS EMBODIMENTS

Further features and advantages will become more readily apparent from the following description of various embodiments as illustrated by way of examples only and in a non-limitative manner.

The term "hematite" as used herein refers, for example, to a compound comprising $\alpha$-$Fe_2O_3$. The compound can also comprise $\gamma$-$Fe_2O_3$, $\beta$-FeO.OH or mixtures thereof.

The expression "iron ions" as used herein refers, for example to ions comprising to at least one type of iron ion chosen from all possible forms of Fe ions. For example, the at least one type of iron ion can be $Fe^{2+}$, $Fe^{3+}$, or a mixture thereof.

The expression "aluminum ions" as used herein refers, for example to ions comprising to at least one type of aluminum ion chosen from all possible forms of Al ions. For example, the at least one type of aluminum ion can be $Al^{3+}$.

The expression "at least one aluminum ion", as used herein refers, for example, to at least one type of aluminum ion chosen from all possible forms of Al ions. For example, the at least one aluminum ion can be $Al^{3+}$.

The expression "at least one iron ion", as used herein refers, for example, to at least one type of iron ion chosen from all possible forms of Fe ions. For example, the at least one iron ion can be $Fe^{2+}$, $Fe^{3+}$, or a mixture thereof.

The expression "at least one precipitated iron ion", as used herein refers, for example, to at least one type of iron ion chosen from all possible forms of Fe ions that was precipitated in a solid form. For example, the at least one iron ion present in such a precipitate can be $Fe^{2+}$, $Fe^{3+}$, or a mixture thereof.

The term "suitable" as used herein means that the selection of the particular conditions would depend on the specific manipulation to be performed, but the selection would be well within the skill of a person trained in the art. All process/method elements described herein are to be conducted under conditions sufficient to provide the desired product. A person skilled in the art would understand that all reaction conditions, including, for example, reaction solvent, reaction time, reaction temperature, reaction pressure, reactant ratio, etc, can be varied to optimize the yield of the desired product and it is within their skill to do so.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "at least substantially maintained" as used herein when referring to a value of a pH or a pH range that is maintained when reacting the basic aqueous composition with hematite refers to maintaining the value of the pH or the pH range at least 75, 80, 85, 90, 95, 96, 97, 98 or 99% of the time during such a reaction.

The expression "at least substantially maintaining" as used herein when referring to a value of a pH or a pH range that is maintained when reacting the basic aqueous composition with hematite refers to maintaining the value of the pH or the pH range at least 75, 80, 85, 90, 95, 96, 97, 98 or 99% of the time during such a reaction.

The expression "at least substantially maintaining" as used herein when referring to a value of a temperature or a temperature range that is maintained when reacting the basic aqueous composition with hematite refers to maintaining the value of the temperature or the temperature range at least 75, 80, 85, 90, 95, 96, 97, 98 or 99% of the time during the process or the portion thereof.

The expression "at least substantially maintained" as used herein when referring to a value of a temperature or a temperature range that is maintained when reacting the basic aqueous composition with hematite refers to maintaining the value of the temperature or the temperature range at least 75, 80, 85, 90, 95, 96, 97, 98 or 99% of the time during the process or the portion thereof.

For example, the methods can further comprise precipitating the aluminum ions from the liquid phase by adjusting pH of the liquid phase at a value of about 7 to about 11, about 8 to about 10.5, about 9 to about 10, about 9.2 to about 9.8, or about 9.5.

For example, aluminum ions can be precipitated from the liquid phase by reacting it with an acid. The acid used can be HCl, $H_2SO_4$, $HNO_3$ or mixtures thereof.

For example, precipitating the aluminum ions can be carried out at a temperature of about 40° C. to about 80° C., about 50° C. to about 70° C. or about 60° C. to about 70° C. For example, precipitating the aluminum ions can be carried out at by at least substantially maintaining the temperature.

For example, the methods can further comprise adding a precipitating agent effective for facilitating precipitation of the aluminum ions. For example, the precipitating agent is a polymer such as an acrylamide polymer.

For example, the basic aqueous composition, before being reacted with the hematite, can comprises at least one precipitate that comprises iron under the form of $Fe^{3+}$, $Fe^{2+}$, or a mixture thereof.

For example, the basic aqueous composition, before being reacted with the hematite, can comprise at least one precipitate that comprises $Fe(OH)_3$, $Fe(OH)_2$, or a mixture thereof.

For example, the basic aqueous composition, before being reacted with the hematite, comprises iron ions under the form of $Fe^{3+}$, $Fe^{2+}$, or a mixture thereof.

For example, the hematite can be reacted with the basic aqueous composition under agitation.

For example, the basic aqueous composition can have a temperature of about 50° C. to about 70° C., about 65° C. to about 75° C., about 70° C. to about 80° C., about 70° C. to about 100° C., about 75° C. to about 110° C., about 80° C. to about 100° C., about 85° C. to about 95° C., about 87° C. to about 93° C., about 70° C. to about 120° C., about 90° C. to about 100° C., about 70° C., about 75° C., about 80° C., about 85° C., about 90° C., or about 95° C.

For example, the basic aqueous composition can be reacted with the hematite by at least substantially maintaining the basic aqueous composition at the temperature.

For example, the reaction between the basic aqueous composition and hematite can be carried out by at least substantially maintaining a temperature of about 50° C. to about 150° C., about 50° C. to about 70° C., about 65° C. to about 75° C., about 70° C. to about 80° C., about 70° C. to about 100° C., about 75° C. to about 110° C., about 80° C. to about 100° C., about 85° C. to about 95° C., about 87° C. to about 93° C., about 70° C. to about 120° C., about 90° C. to about 100° C., about 70° C., about 75° C., about 80° C., about 85° C., about 90° C., or about 95° C.

For example, the basic aqueous composition can have a pH of about 10.8 to about 11.8, about 11 to about 12, about 11.5 to about 12.5, about 11.0 to about 11.6, about 11.2 to about 11.5, about 10.5 to about 12, about 11.5 to about 12.5, or about 11.8 to about 12.2, about 11.0, about 11.1, about 11.2, about 11.3, about 11.4, about 11.5, about 11.6, about 11.7, about 11.8, about 11.9, or about 12.0.

For example, the reaction between the basic aqueous composition and hematite can be carried out by at least substantially maintaining the pH.

For example, the reaction between the basic aqueous composition and hematite can be carried out by at least substantially maintaining a pH of about 10.5 to about 13, about 10.8 to about 11.8, about 11 to about 12, about 11.5 to about 12.5, about 11.0 to about 11.6, about 11.2 to about 11.5, about 10.5 to about 12, about 11.5 to about 12.5, about 11.8 to about 12.2, about 11.0, about 11.1, about 11.2, about 11.3, about 11.4, about 11.5, about 11.6, about 11.7, about 11.8, about 11.9, or about 12.0.

For example, about 0.25 to about 25 g, about 1 to about 20 g, about 1 to about 10 g, about 1.5 to about 5.5 g, or about 2 to about 15 g of hematite can be used per liter of the basic aqueous composition.

For example, the basic aqueous composition can have a concentration of Fe of about 0.5 to about 10 g/L, about 1 to about 7 g/L, or about 1.5 to about 5.5 g/L.

For example, hematite can be into the basic aqueous composition. For example, hematite can be added at a molar ratio hematite/total amount of iron contained in the basic aqueous composition of about 0.005 to about 0.5 or about 0.01 to about 0.1.

For example, the basic aqueous composition can be obtained by:

leaching an iron-containing material comprising iron and aluminum with an acid so as to obtain a leachate comprising the iron ions and the aluminum ions and a solid residue;
separating the leachate from the solid residue; and
reacting the leachate with a base.

For example, the basic aqueous composition can be obtained by leaching an iron-containing material comprising iron and aluminum with an acid so as to obtain a leachate comprising the iron ions and the aluminum ions and a solid residue;
optionally removing at least a portion of the iron ions from the leachate;
separating the leachate from the solid residue; and
reacting the leachate with a base.

For example, the base can be KOH, NaOH, $Ca(OH)_2$, CaO, MgO, $Mg(OH)_2$, $CaCO_3$, $Na_2CO_3$, $NaHCO_3$, or mixtures thereof.

For example, the base can have a concentration of about 2 to about 20M, about 2.5M to about 10M or about 3 to about 4M.

For example, the base can have a concentration of about 30 to about 60 weight %, about 35 to about 55 weight %.

For example, the leachate and a first portion of the base can be added simultaneously into a reactor comprising a second portion of the base. For example, the basic aqueous composition can be reacted with the hematite by at least substantially maintaining the basic aqueous composition at the pH. For example, the basic aqueous composition can be at least substantially maintained at the pH by reacting it with a further amount of the base.

For example, reacting the leachate with the base can generate precipitation of at least a portion of the iron ions into $Fe(OH)_3$, $Fe(OH)_2$, or a mixture thereof.

For example, upon reacting hematite with the basic aqueous composition, at least a portion of the $Fe(OH)_3$, $Fe(OH)_2$, or the mixture thereof can be converted into hematite.

For example, iron can be present in the basic aqueous composition, before reacting it with the hematite, under the form of solubilized ions, a precipitate or a mixture thereof.

For example, the basic aqueous composition can comprise, before reacting it with the hematite, solubilized $Fe^{3+}$ ions, solubilized $Fe^{2+}$ ions or a mixture thereof.

For example, the basic aqueous composition can comprise, before reacting it with the hematite, precipitated iron under the form of $Fe(OH)_3$, $Fe(OH)_2$ or a mixture thereof.

For example, the conditions suitable for at least partially converting the iron into hematite under the form of a precipitate can comprise reacting the basic aqueous composition with hematite at a temperature of about 50° C. to about 150° C., about 50° C. to about 70° C., about 65° C. to about 75° C., about 70° C. to about 80° C., about 70° C. to about 100° C., about 75° C. to about 110° C., about 80° C. to about 100° C., about 85° C. to about 95° C., about 87° C. to about 93° C., about 70° C. to about 120° C., about 90° C. to about 100° C., about 70° C., about 75° C., about 80° C., about 85° C., about 90° C., or about 95° C.

For example, the conditions suitable for at least partially converting the iron into hematite under the form of a precipitate can comprise at least substantially maintaining the temperature while reacting the basic aqueous composition with hematite.

For example, the conditions suitable for at least partially converting the iron into hematite under the form of a precipitate can comprise reacting the basic aqueous composition with hematite at a pH of about 10.5 to about 13, about 10.8 to about 11.8, about 11 to about 12, about 11.5 to about 12.5, about 11.0 to about 11.6, about 11.2 to about 11.5, about 10.5 to about 12, about 11.5 to about 12.5, about 11.8 to about 12.2, about 11.0, about 11.1, about 11.2, about 11.3, about 11.4, about 11.5, about 11.6, about 11.7, about 11.8, about 11.9, or about 12.0.

For example, the conditions suitable for at least partially converting the iron into hematite under the form of a precipitate can comprise at least substantially maintaining the pH while reacting the basic aqueous composition with hematite.

For example, the conditions suitable for at least partially converting the iron into hematite under the form of a precipitate can comprise reacting about 0.25 to about 25 g of, about 0.5 to about 25 g, about 1 to about 20 g, about 1 to about 10 g, about 1.5 to about 5.5 g, or about 2 to about 15 g of hematite per liter of the basic aqueous composition.

For example, the precipitated aluminum ions can be under the form of $Al(OH)_3$.

For example, the methods can further comprise converting $Al(OH)_3$ into $Al_2O_3$. Such a conversion can be done, for example, in various manner including by those as described in WO 2008/141423.

For example, the methods can further comprise converting $Al(OH)_3$ into $AlCl_3$. Such a conversion can be done, for example, by reacting $Al(OH)_3$ with HCl.

For example, the methods can further comprise converting $AlCl_3$ into $Al_2O_3$. Such a conversion can be done, for example, in various manner including by thermal decomposition and calcination. For example, the decomposition/calcination can be done in a rotary furnace. For example, it can be done at variable speed where the temperature gradually rises from 300° C. at the entry to reach around 1250° C. at its maximum.

For example, the at least one precipitated iron ion can be chosen from $Fe^{3+}$, $Fe^{2+}$, and a mixture thereof.

For example, the at least one precipitated iron ion can be under the form of $Fe(OH)_2$, $Fe(OH)_3$, or a mixture thereof.

For example, the predetermined quantity of hematite can be added to the basic aqueous composition, over a predetermined period of time, optionally under agitation.

For example, the predetermined quantity of hematite can be added at a molar ratio hematite/the at least one iron ion of about 0.005 to about 0.5 or about 0.01 to about 0.1.

For example, the basic aqueous composition can be obtained by:
leaching an aluminum-containing ore comprising the at least one iron ion (or comprising iron) with an acid so as to obtain a leachate and a solid residue;
separating the leachate from the solid residue; and
reacting the leachate with a base.

For example, the basic aqueous composition can be obtained by:
leaching an aluminum-containing ore comprising the at least one iron ion (or comprising iron) with an acid so as to obtain a leachate and a solid residue;
optionally removing at least a portion of the iron ions from the leachate;
separating the leachate from the solid residue; and
reacting the leachate with a base.

For example, the acid used for leaching can be HCl, $H_2SO_4$, $HNO_3$ or mixtures thereof.

The iron-containing material can be an aluminum-containing material, The aluminum-containing material can be an aluminum-containing ore. For example, clays, argillite, mudstone, beryl, cryolite, garnet, spinel, bauxite, or mixtures thereof can be used as starting material. The aluminum-containing material can also be a recycled industrial aluminum-containing material such as slag. The aluminum-containing material can also be red mud or fly ashes.

The acid used for leaching aluminum-containing ore can be HCl, $H_2SO_4$, $HNO_3$ or mixtures thereof. More than one acid can be used as a mixture or separately. Solutions made with these acids can be used at various concentration. For example, concentrated solutions can be used. For example, 6M or 12M HCl can be used. For example, up to 100% wt $H_2SO_4$ can be used.

The leaching can be carried out under pressure. For example, the pressure can be about 10 to about 300 psig, about 25 to about 250 psig, about 50 to about 200 psig or about 50 to about 150 psig. The leaching can be carried out for about 30 minutes to about 5 hours. It can be carried out at a temperature of about 60 to about 300° C., about 75 to about 275° C. or about 100 to about 250° C.

After the leaching, various bases can be used for raising up the pH such as KOH, NaOH, $Ca(OH)_2$, CaO, MgO, $Mg(OH)_2$, $CaCO_3$, $Na_2CO_3$, $NaHCO_3$, or mixtures thereof.

For example, iron ions can be precipitated. When precipitating iron ions, the iron ions can be precipitated by means of an ionic precipitation and they can precipitate in the form of various salts, hydroxides or hydrates thereof. For example, the iron ions can be precipitated as $Fe(OH)_3$, $Fe(OH)_2$, hematite, geotite, jarosite or hydrates thereof.

For example, aluminum ions can be precipitated. When precipitating aluminum ions, the aluminum ions can be precipitated by means of an ionic precipitation and they can precipitate in the form of various salts, (such as chlorides, sulfates) or hydroxides or hydrates thereof. For example, the aluminum ions can be precipitated as $Al(OH)_3$, $AlCl_3$, $Al_2(SO_4)_3$, or hydrates thereof.

The methods of the present disclosure can be effective for treating various aluminum-containing ores. For example, clays, argillite, mudstone, beryl, cryolite, garnet, spinel, bauxite, or mixtures thereof can be used as starting material.

The leaching can be carried out at a pH of about 0.5 to about 2.5., about 0.5 to about 1.5, or about 1; then iron can be precipitated at a pH of at least about 9.5, 10, 10.5, 11, 11.5; then aluminum can be precipitated at a pH of about 7 to about 11, about 7.5 to about 10.5, or about 8 to about 9.

The leaching can be carried out under pressure into an autoclave. For example, it can be carried out at a pressure of 5 KPa to about 850 KPa, 50 KPa to about 800 KPa, 100 KPa to about 750 KPa, 150 KPa to about 700 KPa, 200 KPa to about 600 KPa, or 250 KPa to about 500 KPa. The leaching can be carried out at a temperature of at least 80° C., at least 90° C., or about 100° C. to about 110° C. In certain cases it can be done at higher temperatures so as to increase extraction yields in certain ores.

For example, the methods can further comprise precipitating the aluminum ions from the liquid phase by adjusting the pH at a value of about 7 to about 11 or about 8 to about 10.5. The methods can further comprise adding a precipitating agent effective for facilitating precipitation of the aluminum ions. For example, the precipitating agent can be a polymer. For example, the precipitating agent can be an acrylamide polymer.

For example, the seeding agent can be hematite.

EXAMPLE 1

Preparation of Hematite

Hematite (0.5 g) was added to a basic aqueous composition (300 mL) having a temperature of about 90° C. The basic aqueous composition contained about 17 to about 20 wt % of iron precipitate under the form of $Fe(OH)_2$ and $Fe(OH)_3$. The basic aqueous composition was heated over a period of time of about 5 minutes to about 20 hours under agitation at atmospheric pressure. Hematite was added over a period of time of about 5 minutes to about 20 hours at atmospheric pressure. After about 1 hour, a change of color of the precipitate is observed (from brown to red brick). The red color was intensified until a red intense color having the same color than hematite was obtained.

The above-mentioned example was carried out as a proof of concept. Then further examples have been carried out so as to carry out the precipitation of hematite from a basic aqueous that was derived from an acid leaching solution. The acid leaching solution was obtained by leaching an aluminum-containing ore (for example argillite) with HCl.

EXAMPLE 2

Preparation of Hematite from an Aluminum-Containing Ore Sample

The aluminum-containing ore (for example argillite) can be activated mechanically by grinding. Mineral activation leads to a positive influence on the leaching reaction kinetics. For example, a ball mill can be used in air atmosphere for about 2 to 4 hours. Argillite can be also calcinated. This stage of pretreatment can be accomplished at a calcinating temperature between about 400 to about 700° C. for a period about 1 to about 2 hours. These two operations, for example, increase the quantity of extracted aluminum by about 25 to 40%.

Acid Leaching

Acid leaching can be made by mixing activated argillite with an acid solution (for example HCl) at elevated temperature and under pressure during a given period of time. For example, the argillite/acid ratio can be of about 1:3 (weight/volume), the concentration of about 6M, the pressure can be of about 70 to about 80 psi, the temperature can be of about 150 to about 170° C., and the reaction time can be about 1 hour to about 7 hours. Under these conditions, over 90% of aluminum and 100% of the iron can be extracted besides the impurities.

At the end of extraction, the solid (not dissolved portion) can be separated from the liquid rich aluminum and iron by decantation or by filtration, after which is washed. This solid represent about 50 to about 60% of the initial mass of argillite. It can be valorized and be used as constituent alloy.

Removal of Iron

The iron contained in the solution can be removed by selectively precipitating it at certain pH values. For example, iron removal can be carried out by precipitation in basic medium at a pH greater than about 11.2. This stage can be made by adding the solution containing aluminum and iron in a basic aqueous composition, for example NaOH at a concentration of 6M. Other bases such as KOH can also be used. Iron can thus be precipitated under the form of compounds such as $Fe(OH)_2$ and/or $Fe(OH)_3$.

During the second half of such a treatment, hematite can be added (can be called seeding hematite). Hematite seed addition can enhance hematite precipitation reaction (for example transformation of $Fe(OH)_2$ and/or $Fe(OH)_3$ into hematite). For example, 10 g of hematite can be added to 1L of basic aqueous composition optionally under agitation. The concentration of Fe in the solution was about 2.5 to about 3.0 g/L. The reaction temperature can be of about 80° C. to about 140° C. (for example, the basic aqueous composition can be at such a temperature), and the reaction time can be of about 3 hours to about 72 hours. Under such conditions, about 98% to about 100% of iron can be precipitated and about 70% to 100% of this iron can be precipitated as hematite. Optionally, it is possible to recover iron by using a refining step by liquid-liquid extraction through a hollow fiber membrane.

It is possible to separate the solid portion from the liquid portion by filtration, decantation or centrifugation and to rinse the solid by means of a diluted base, such as a solution of NaOH (for example NaOH at a concentration of 1M to 2M). At the end of this step, the solid can be washed with water.

Aluminum Recovery

This step can also be carried in various ways. Aluminum ions can be precipitated under the form of aluminum hydroxide. For example, an hydrated form of $Al(OH)_3$ can be obtained by addition of a liquid acid, at a pH of about 7 to about 10.5 or about 7.5 to about 10 or about 9, the temperature can be of about 50° C. to about 80° C., and the reaction time can be of about 3 hours to about 24 hours. This step can be made by adding a solution of HCl, for example at a concentration of 6M. Other acid can also be used. From the previous step, for example 90 to 100% aluminum hydroxide can be precipitated.

Alternatively, aluminum ions can be precipitated by addition of an acid gas. For example, an hydrated form of $Al(OH)_3$ sprayed by $CO_2$, at a pH of about 7 to about 10.5, the temperature can be of 50° C. to 80° C., and the reaction time can be of about 3 hours to about 24 hours. From the previous step, for example 90 to 100% aluminum hydroxide can be precipitated.

Another way of precipitating aluminum ions can be carried out by addition of flocculating agent. Various flocculating agents can help to the formation of voluminous flakes which settles by sedimentation. For example, an acrylamide polymer can be used, at a concentration of about 0.1% to about 0.3%. The ratio flocculating agent/solution of hydroxide aluminum can be about 1:300 (volume/volume). The temperature can be below 30° C. and the reaction time can be of about 5 minutes to about 20 minutes. Under such conditions, more about 97% of the aluminum can be precipitated.

EXAMPLE 3

Preparation of Hematite from an Aluminum-Containing Ore Sample

Argillite

The argillite was ground up in the wet phase in a ball grinder. The mixture of water and roughly crushed argillite coming from the mine was fed into the grinder, where the mineral is reduced to less than 100 microns. The mud went down by gravity into a mixer outfitted with two impellers, which ensures a good homogeneity. When the mixture reaches the desired density, the contents of the mixer are pumped to an accumulation bunker, which will serve to feed the mud to an autoclave.

Acid

The acid fed to the leaching came from two sources. The major portion was recycled spent acid. This recycled acid contained about 20 to about 22 wt. % of hydrochloric acid (HCl) and about 10 to about 11% of $AlCl_3$. For example, if excess acid is required, a small quantity of fresh 36% acid can be used.

Leaching

The mud of argillite and acid were fed to the autoclave of 32 $m^3$ in stoichiometric proportion. The autoclave was then hermetically sealed, mixed well and heated by indirect contact with the steam-fed jacket. As the temperature was rising, the steam pressure increased such that the reaction reached a temperature of about 175° C. and a pressure of about 7.5 barg. At the end of the leaching cycle, the metals contained in the argillite were converted into chlorides. The mixture was then cooled by indirect contact with the cooling water in the reactor jacket. When the mixture was at about 70 to about 80° C., the leached mud was transferred by air pressure to two buffer reservoirs maintained in communicating vessels for further treatment and disposal and the leachate was thus ready for further treatments.

Preparation of Hematite

The mother liquor from leaching (leachate) was pumped at constant rate across cartridge filters to the first iron precipitation reactor. This reservoir was well mixed and the temperature was controlled to about 65 to 70° C. by means of a heating coil. The pH was continuously metered and the solution was maintained at a pH of about 12 by addition of 50 wt % caustic soda with the help of a dispensing pump. The precipitation reaction converted the iron chloride and the other metal chlorides into hydroxides, which were leading to a gradual precipitation and agglomeration of the solid crystals. The leachate was then fed consecutively to two other precipitation reactors when the pH was also controlled by the addition of caustic soda and the temperature maintained by a heating coil. At the exit from the last reactor, the liquor was fed to a gravity decanter.

Decanting and Seeding

The purpose of the gravity decanter was to produce a thickened mud of the largest crystals of hematite. These crystals served for the seeding in the first precipitation reactor. It was observed that such a technique was useful to promote the creation of precipitates (hematite) that are larger and more easy to filter. A quantity of about 1.5 to about 5.5 g of hematite per liter of the solution was used for seeding. The concentration of Fe in the solution was about 2.5 to about 3.0 g/L.

Filtration of Hematite

The filtration of the hematite was carried out with the help of two automated filter presses. The mother liquor was then sent to a buffer reservoir to be pumped to the aluminum precipitation reactor.

Neutralization of Hematite

The washed hematite was sent to a blade mixer where the pH of the solid is metered. A pH less than about 8 was maintained by the addition of hydrochloric acid (HCl) with the help of a dispensing pump.

Precipitation of Aluminum

For the precipitation of the aluminum, the pH of the mother liquor was adjusted to about 9.5 by reacting it with HCl. Since the mother liquor has been purified of all other metals, the obtained precipitate was white and with purity of at least 98.5%.

The mother liquor was pumped at constant rate across guard filters to the first main reactor for precipitation of aluminum hydroxide. This reservoir was maintained in suspension by an impeller and the temperature was controlled at 65° C. with the help of a heating coil. The pH was metered continuously and the solution was maintained at pH of about 9.5 by addition of HCl using a dispensing pump. The precipitation reaction was effective for converting the aluminum chloride into aluminum hydroxide, which resulted in a gradual precipitation and agglomeration of solid crystals. The liquor was then sent consecutively to two other precipitation reactors where the pH was also controlled by the adding of acid and the temperature maintained by a coil. At the exit from the last reactor, the liquor is fed to a gravity decanter.

Decanting and Seeding

A gravity decanter was also used to produce a thickened Al(OH)$_3$ mud of the largest crystals. These crystals were pumped from the bottom of the decanter to the first precipitation reactor to seed the crystallization.

The rest of the Al(OH)$_3$ mud and the supernatant fluid of the decanter were sent to a repulping tank from which the mixture was pumped to a centrifuge type separator/washer. After the treatment with the separator, the Al(OH)$_3$ was then dried.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A method for separating iron ions from aluminum ions contained in a basic aqueous composition, said method comprising:
   providing a basic aqueous composition comprising said iron ions and said aluminum ions and having a pH of about 10.5 to about 13 and a temperature of about 50° C. to about 150° C.;
   reacting said basic aqueous composition with hematite so as to promote, catalyze and/or enhance formation of hematite and to obtain a liquid phase comprising said aluminum ions and a solid phase comprising said so-formed hematite generated with said iron ions; and
   separating said liquid phase from said solid phase.

2. The method of claim 1, wherein said method further comprises precipitating said aluminum ions from said liquid phase by adjusting pH of said liquid phase to a value of about 7 to about 11.

3. The method of claim 1, wherein said method further comprises precipitating said aluminum ions from said liquid phase by adjusting the pH of said liquid phase to a value of about 8 to about 10.5.

4. The method of claim 1, wherein said method further comprises precipitating said aluminum ions from said liquid phase by adjusting pH of said liquid phase to a value of about 9 to about 10.

5. The method of claim 1, wherein said method further comprises precipitating said aluminum ions from said liquid phase by adjusting pH of said liquid phase to a value of about 9.2 to about 9.8.

6. The method of claim 5, wherein said method further comprises adding a precipitating agent effective for facilitating precipitation of said aluminum ions.

7. The method of claim 1, wherein said basic aqueous composition, before being reacted with said hematite, comprises at least one precipitate that comprises Fe(OH)$_3$, Fe(OH)$_2$, or a mixture thereof.

8. The method of claim 1, wherein said basic aqueous composition has a temperature of about 50° C. to about 70° C.

9. The method of claim 1, wherein said basic aqueous composition has a temperature of about 70° C. to about 100° C.

10. The method of claim 1, wherein said basic aqueous composition has a pH of about 10.8 to about 11.8.

11. The method of claim 1, wherein said basic aqueous composition has a pH of about 11.5 to about 12.5.

12. The method of claim 1, wherein about 0.5 to about 25 g hematite are reacted per liter of said basic aqueous composition.

13. The method of claim 1, wherein hematite is added at a molar ratio hematite / total amount of iron contained in the basic aqueous composition of about 0.01 to about 0.1.

14. The method of claim 1, wherein said basic aqueous composition is reacted with said hematite by at least substantially maintaining said basic aqueous composition at said temperature.

15. A method for separating iron from aluminum contained in a basic aqueous composition, said method comprising:
   reacting said basic aqueous composition comprising said iron and said aluminum with hematite under conditions suitable for at least partially converting said iron into hematite in the form of a precipitate, thereby obtaining a liquid phase and a solid phase, said conditions suitable for at least partially converting said iron into hematite in the form of a precipitate comprises reacting said basic aqueous composition with hematite at a pH of about 10.5 to about 13;
   separating said liquid phase from said solid phase; and
   precipitating aluminum ions from said liquid phase by adjusting pH of said liquid phase to a value of about 7 to about 11.

16. The method of claim 15, wherein said method further comprises precipitating said aluminum ions from said liquid phase by adjusting pH of said liquid phase to a value of about 9 to about 10.

17. The method of claim 15, wherein said hematite is reacted with said basic aqueous composition under agitation.

18. The method of claim 15, wherein said conditions suitable for at least partially converting said iron into hematite in the form of a precipitate comprises reacting said basic aqueous composition with hematite at a temperature of about 50° C. to about 150° C.

19. The method of claim 15, wherein said conditions suitable for at least partially converting said iron into hematite in the form of a precipitate comprises reacting said basic aqueous composition with hematite at a pH of about 11.5 to about 12.5; and comprises reacting about 0.25 to about 25 g of hematite per liter of said basic aqueous composition.

20. The method of claim 15, wherein said conditions suitable for at least partially converting said iron into hematite in the form of a precipitate comprises reacting said basic aqueous composition with hematite at a pH of about 10.8 to about 11.8; and comprises reacting about 1 to about 20 g of hematite per liter of said basic aqueous composition.

\* \* \* \* \*